US012235088B2

(12) United States Patent
Bonora et al.

(10) Patent No.: US 12,235,088 B2
(45) Date of Patent: Feb. 25, 2025

(54) SHAPED CHARGE WARHEAD AND A METHOD FOR PRODUCING SAID WARHEAD

(71) Applicant: TECHDYN ENGINEERING SOCIETA' A RESPONSABILITA' LIMITATA—AZIENDA SPIN-OFF ACCADEMICO, DELL'UNIVERSITA' DEGLI STUDI DI CASSINO, Rome (IT)

(72) Inventors: Nicola Bonora, Cassino (IT); Gianluca Iannitti, Sant'Apollinare (IT); Andrew Ruggiero, Castelforte (IT); Gabriel Testa, Piedimonte San Germano (IT)

(73) Assignee: TECHDYN ENGINEERING SOCIETA' A RESPONSABILITA' LIMITATA—AZIENDA SPIN-OFF ACCADEMICO DELL'UNIVERSITA' DEGLI STUDI DI CASSINO, Rome (IT)

( * ) Notice: Subject to any disclaimer, the term of this patent is extended or adjusted under 35 U.S.C. 154(b) by 35 days.

(21) Appl. No.: 18/307,307

(22) Filed: Apr. 26, 2023

(65) Prior Publication Data
US 2024/0200921 A1 Jun. 20, 2024

(30) Foreign Application Priority Data
Apr. 28, 2022 (IT) .................. 102022000008426

(51) Int. Cl.
F42B 1/028 (2006.01)
F42B 1/032 (2006.01)
(Continued)

(52) U.S. Cl.
CPC .......... *F42B 33/0214* (2013.01); *F42B 1/028* (2013.01); *F42B 1/032* (2013.01); *F42B 12/10* (2013.01); *B33Y 80/00* (2014.12)

(58) Field of Classification Search
CPC .. F42B 1/02; F42B 1/028; F42B 1/032; F42B 1/036
See application file for complete search history.

(56) References Cited

U.S. PATENT DOCUMENTS 2,587,243 A * 2/1952 Sweetman ................ F42B 1/02
83/53
2,605,703 A * 8/1952 Lawson .................. F42B 1/032
29/421.2

(Continued)

FOREIGN PATENT DOCUMENTS

CA 2103736 A1 2/1995
DE 29713229 U1 * 12/1998 .............. F42B 1/028

(Continued)

OTHER PUBLICATIONS

European Search Report dated Aug. 14, 2023 from counterpart EP App No. 23168501.7.

(Continued)

*Primary Examiner* — Derrick R Morgan
(74) *Attorney, Agent, or Firm* — SHUTTLEWORTH & INGERSOLL, PLC; Timothy J. Klima

(57) ABSTRACT

Described is a shaped charge warhead comprising an axially symmetric fragmentation casing designed to define a containment space and having in a base portion a casting hole for the explosive, a detonator housed in the casting hole and a conical liner of the shaped charge positioned inside the containment space.
The casing and the conical or hemispherical liner, with a variable thickness, if necessary, are made in a single piece.

(Continued)

The casing extends along a respective axis of extension in such a way as to also define a standoff of the charged warhead.

9 Claims, 1 Drawing Sheet

(51) Int. Cl.
*F42B 12/10* (2006.01)
*F42B 33/02* (2006.01)
*B33Y 80/00* (2015.01)

(56) References Cited

U.S. PATENT DOCUMENTS

| | | | | |
|---|---|---|---|---|
| 3,025,794 | A * | 3/1963 | Lebourg | F42B 1/032 |
| | | | | 102/306 |
| 3,104,186 | A * | 9/1963 | Lindbergh | F27D 25/006 |
| | | | | 134/17 |
| 3,242,987 | A * | 3/1966 | Lebourg | F42B 1/028 |
| | | | | 166/299 |
| 4,109,576 | A * | 8/1978 | Eckels | F42B 1/02 |
| | | | | 102/307 |
| 4,126,092 | A | 11/1978 | Cross | |
| 4,222,329 | A * | 9/1980 | Austin | F42B 1/02 |
| | | | | 102/305 |
| 5,415,101 | A * | 5/1995 | Brinkmann | F42B 1/02 |
| | | | | 102/307 |
| 5,522,319 | A * | 6/1996 | Haselman, Jr. | F42B 1/028 |
| | | | | 102/306 |
| 5,792,980 | A * | 8/1998 | Weimann | F42B 1/024 |
| | | | | 102/438 |
| 5,859,383 | A * | 1/1999 | Davison | C06B 25/34 |
| | | | | 102/307 |
| 6,494,139 | B1 * | 12/2002 | Powell | F42B 12/10 |
| | | | | 175/4.6 |
| 6,606,950 | B1 * | 8/2003 | Putman | F41H 11/12 |
| | | | | 102/306 |
| 6,786,157 | B1 * | 9/2004 | Powell | F42D 3/00 |
| | | | | 102/306 |
| 9,360,222 | B1 * | 6/2016 | Collier | F24B 1/028 |
| 9,476,682 | B1 * | 10/2016 | Powell | F42B 12/12 |
| 2005/0115448 | A1 * | 6/2005 | Pratt | F42B 1/032 |
| | | | | 102/476 |
| 2007/0214991 | A1 * | 9/2007 | Ronn | F42B 1/028 |
| | | | | 102/306 |
| 2010/0043661 | A1 * | 2/2010 | Graham | F42B 1/028 |
| | | | | 102/307 |
| 2011/0239888 | A1 * | 10/2011 | Waddell | F42B 1/032 |
| | | | | 102/307 |
| 2012/0247358 | A1 * | 10/2012 | Daoud | F42B 1/032 |
| | | | | 102/305 |
| 2018/0299234 | A1 * | 10/2018 | Baum | F42B 1/036 |
| 2019/0041173 | A1 * | 2/2019 | Yang | E21B 43/117 |
| 2019/0310056 | A1 * | 10/2019 | Loehken | F42B 1/028 |
| 2020/0378736 | A1 * | 12/2020 | Vinci | F42D 1/02 |
| 2021/0310773 | A1 * | 10/2021 | Johnson | F42B 3/22 |
| 2023/0131652 | A1 * | 4/2023 | Loehken | F42B 1/036 |
| | | | | 102/307 |
| 2023/0364673 | A1 * | 11/2023 | Hoelscher | B22F 3/03 |

FOREIGN PATENT DOCUMENTS

| | | |
|---|---|---|
| WO | 2004048880 A1 | 6/2004 |
| WO | 2020027736 A1 | 2/2020 |

OTHER PUBLICATIONS

Italian Search Report dated Nov. 24, 2022 from counterpart Italian App No. 2022000008426.

* cited by examiner

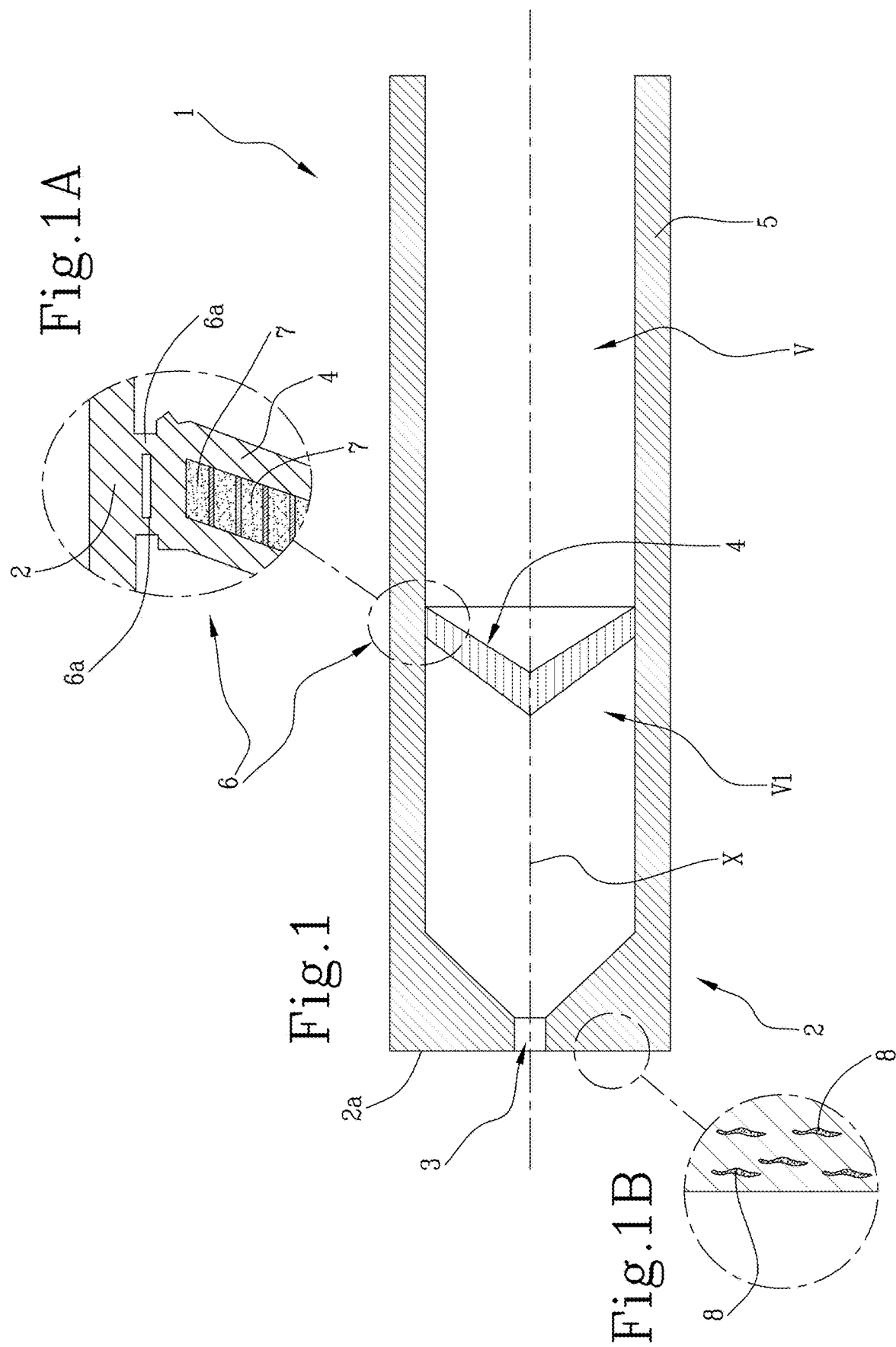

SHAPED CHARGE WARHEAD AND A METHOD FOR PRODUCING SAID WARHEAD

This invention relates to a shaped charge warhead and a method for producing the warhead.

In particular, the invention is applicable or may be applied in the defence, demolition or mining sector.

A shaped charge warhead (SCW) is a device comprising a fragmentation casing which defines the space inside which a shaped charge liner is positioned. The space between the liner and the casing is filled with explosives.

At the base of the casing there is a hole for housing the detonator for triggering the explosive. The shape of the casing close to the rear region may be further shaped in a truncated cone shape for a more effective concentration of the pressure wave on the liner. The SCW is mounted on a standoff which establishes the optimum distance for the formation of the slug.

The detonation of the explosive causes a pressure wave which strikes the liner causing the walls to collapse along the axis of axially symmetry of the cone. The high pressure causes the heating of the material, thus increasing the propensity to sliding (less resistance and greater ductility). The collapse of the walls of the liner concentrates the mass of the liner along the axis. The vertex of the cone moves in an axial direction before the portions of material on the walls which are struck by the pressure wave at successive points in time. This causes the formation of a slug of practically melted material with a difference in speed between the apex of the slug and the tail which causes the extension and, if necessary, the fragmentation over long distances. However, not all the material of the liner participates in the formation of the slug.

Currently, the solutions available provide for each element of the SCW to be made separately and then assembled, and for the explosive to be located inside the casing.

Moreover, the materials for the casing, the liner and the standoff are generally different and the materials for the liner are limited to certain classes of metals and alloys (mainly copper and in some cases aluminium).

Moreover, the liner is obtained by subtracting techniques and the shape is generally conical with a constant thickness or hemispherical with a constant thickness.

The casing may have grooves machined on the inside or outside surface. These grooves are designed to control the dimensions of the fragments.

Lastly, the SCW can be assembled in a configuration with two shaped charges in line to maximise penetration.

Disadvantageously, the assembly operation is critical as misalignments between the liner and the casing can result in asymmetries in the extension of the detonation wave which are reflected in the shape and the penetrative capacity of the slug.

Disadvantageously, the current technologies for making liners are limited only to some classes of materials which are very ductile and do not allow the production of liners with variable thicknesses.

Disadvantageously, the main technique for controlling the fragmentation of the casing is based on the creation of surface geometrical defects by means of machining by removal. In this way, the possible geometrical configurations of defects which can be used are greatly limited.

The technical purpose of the invention is therefore to provide a shaped charge warhead and a method for producing the warhead which are able to overcome the drawbacks of the prior art.

The aim of the invention is therefore to provide a shaped charge warhead and a method for producing the warhead which allow the assembly operations to be eliminated.

A further aim of the invention is to provide a shaped charge warhead and a method for producing the warhead which allow a liner to be made with a variable thickness and to use materials which cannot be used with traditional machining techniques.

The technical purpose indicated and the aims specified are substantially achieved by a shaped charge warhead and a method for producing the warhead comprising the technical features described in one or more of the accompanying claims.

The dependent claims correspond to possible embodiments of the invention.

In particular, the technical purpose indicated and the aims specified are substantially achieved by a shaped charge warhead comprising an axially symmetrical fragmentation casing designed to define a containment space and having in an end wall a casting hole for the explosive, a detonator housed in the casting hole and a conical or hemispherical shaped charge liner positioned inside the containment space.

The casing and the liner are made in a single body, preferably by means of additive manufacturing. The casing extends along a respective axis of extension in such a way as to also define a standoff of the charge warhead.

The technical purpose indicated and the aims specified are also achieved by a method for producing a shaped charge warhead as described above comprising the steps of:
  making a casing and a conical liner defining a single body using an additive manufacturing technique;
  introducing explosive through the casting hole of the casing in a space defined between the casing and the conical or hemispherical liner;
  closing the casting hole housing a detonator in the casting hole.

Further features and advantages of the invention are more apparent in the non-limiting description which follows of a non-exclusive embodiment of a shaped charge warhead and a method for producing the warhead.

The description is set out below with reference to the accompanying drawings which are provided solely for purposes of illustration without restricting the scope of the invention and in which:

FIG. 1 is a schematic representation of the shaped charge warhead according to the invention;

FIG. 1A is a schematic representation of a detail of the warhead of FIG. 1;

FIG. 1B is a schematic figure of geometrical defects in the base portion of the warhead of FIG. 1.

With reference to the accompanying drawings, the numeral 1 denotes in its entirety a shaped charge warhead which, for simplicity of description, will hereafter be referred to as warhead 1.

The warhead 1 comprises an axially symmetric casing 2 designed to define a containment space "V" and having in a base portion 2a a casting hole 3 for the explosive. According to a preferred embodiment the casing 2 has a cylindrical shape but other configurations can be made.

Preferably, the base portion 2a of the casing 2 has geometrical defects 8 in the form of volumes of powders which are non-sintered and/or the presence of shaping in the thickness. In other words, the base portion 2a has geometrical defects 8 and/or geometrical discontinuities in the thickness.

The warhead 1 also comprises a detonator (not illustrated) housed in the casting hole 3.

The warhead 1 also comprises a conical or hemispherical shaped charge liner 4 positioned inside the containment space "V". For simplicity of description, reference will be made solely to the conical liner 4 but, what is stated below, is also applicable to a hemispherical liner.

Preferably, the conical liner 4 has a variable thickness. In this way, the variable thickness of the conical liner 4 allows the distribution of the masses participating in the formation of the slug to be optimised.

Preferably, the conical liner 4 has a structure with cellular partitions 7. Each cellular partition 7 contains non-sintered powder which contributes to the formation of the slug.

The casing 2 and the conical liner 4 are made in a single body by means of an additive manufacturing technique. In other words, the casing 2 and the conical liner 4 are made in a single part without interruption.

Preferably, the casing 2 and the conical liner 4 are made by means of additive manufacturing by powder bed fusion.

The casing 2 extends along a respective axis of extension "X" in such a way as to also define a standoff 5 of the warhead 1.

The conical liner 4 is connected to the casing 2 by a continuous connection 6 made with non-sintered spaces. In particular, the continuous connection 6 is made by means of two connecting bodies 6a. The use of non-sintered spaces advantageously allows the controlled detachment of the conical liner 4 at the moment of the arrival of the detonation wave.

Preferably, the warhead 1 is made by means of powders for additive manufacturing.

Preferably, the warhead 1 is made of powders of metal alloys which include copper alloys, aluminium alloys, tungsten, bismuth or zirconium alloys. The warhead 1 may also be made with other types of metallic powder not described here.

Advantageously, the above-mentioned warhead 1 has a high constructional simplicity.

Advantageously, the particular structure of the conical liner 4 guarantees a greater effectiveness of the warhead 1. In other words, the warhead 1 has a greater penetrative capacity which guarantees better performance in the various fields of use of the warhead 1.

Advantageously, the warhead 1 can be made from materials which could not otherwise be used.

The invention also relates to a method for producing the shaped charge warhead 1 as described above. For this reason, the warhead 1 can be obtained with the method according to the invention.

The method comprises a first step of making a casing 2 and a conical liner 4 defining a single body using an additive manufacturing technique. The ideal solution for defining the single body has been found by means of numerical simulation with structural, qualified and certified software used in the reference sector.

The dimensions of the single body may be scaled up with the only limit of the maximum dimensions of the pressing space of the machine used.

Preferably, the casing 2 and the conical liner 4 are made by means of additive manufacturing by powder bed fusion.

For this reason, the warhead 1 is made by means of powders for additive manufacturing. Preferably, the warhead 1 is made of powders of copper, aluminium alloys, tungsten, bismuth or zirconium alloys.

The method also comprises introducing explosive device through the casting hole 3 of the casing 2. In particular, the explosive device is introduced into a space "V1" defined between the casing 2 and the conical liner 4.

Lastly, the method comprises closing the casting hole 3 (that is, said space "V1") housing a detonator in the casting hole 3.

Preferably, the method also comprises a step of performing a thermal treatment after the step of making the single body and a step of surface finishing following a removal of forging supports.

In other words, where necessary, the method comprises processing the warhead 1 to remove possible imperfections due to the additive manufacturing technique used.

Advantageously, the invention is able to overcome the drawbacks of the prior art.

Advantageously, the invention allows the assembly operations to be eliminated.

Advantageously, the invention allows a liner to be made with variable thickness and materials to be used which cannot normally be used with traditional processing techniques.

Advantageously, the invention allows, with the introduction of geometrical defects 8 inside the thickness of the casing, the dimensions of the fragments caused by the detonation to be controlled.

In other words, the invention is characterised by a high level of constructional simplicity and greater effectiveness of the "liner".

The invention claimed is:

1. A shaped charge warhead comprising:
    an axially symmetric casing configured to define a containment space and having in a base portion with a casting hole for an explosive;
    a detonator housed in said casting hole;
    a conical or hemispherical shaped charge liner positioned inside the containment space;
    said casing and said conical or hemispherical shaped charge liner being configured monolithically in a single body, said casing extending along a respective axis of extension to also define a standoff of the shaped charge warhead;
    wherein said conical or hemispherical shaped charge liner has a structure with cellular partitions, each of the cellular partitions containing non-sintered powder.

2. The shaped charge warhead according to claim 1, wherein said casing is cylindrical and said cylindrical casing and said conical or hemispherical shaped charge liner are made by additive manufacturing.

3. The shaped charge warhead according to claim 1, wherein said conical or hemispherical shaped charge liner has a variable thickness.

4. The shaped charge warhead according to claim 1, wherein said casing is cylindrical and said conical or hemispherical shaped charge liner is connected to the cylindrical casing by a continuous connection made with non-sintered spaces.

5. The shaped charge warhead according to claim 1, wherein said shaped charge warhead is made of additive manufacturing powders of copper, aluminum alloys, tungsten, bismuth or zirconium alloys.

6. The shaped charge warhead according to claim 1, wherein said casing is cylindrical and a base portion of said cylindrical casing has geometrical defects in the form of volumes of powder which are non-sintered and/or geometrical discontinuities in a thickness.

7. A production method for producing a shaped charge warhead, comprising the steps of:
    providing a shaped charge warhead comprising:

an axially symmetric cylindrical casing configured to define a containment space and having a base portion with a casting hole for an explosive;
a detonator housed in said casting hole;
a conical shaped charge liner positioned inside the containment space;
said casing and said conical shaped charge liner being configured monolithically in a single body, said cylindrical casing extending along a respective axis of extension to also define a standoff of the shaped charge warhead;
wherein said conical shaped charge liner has a structure with cellular partitions, each of the cellular partitions containing non-sintered powder;
making the cylindrical casing and the conical shaped charge liner in the monolithic single body using an additive manufacturing technique;
introducing the explosive through said casting hole of the cylindrical casing in a space formed between said cylindrical casing and said conical shaped charge liner;
closing said casting hole housing the detonator.

8. The production method according to claim 7, wherein said cylindrical casing and said conical shaped charge liner are made by additive manufacturing by powder bed fusion.

9. The production method according to claim 7, and further comprising a step of performing a thermal treatment after the step of making the single body and a step of surface finishing.

* * * * *